Jan. 18, 1938. G. KAMSVAAG 2,105,536
HEATING SYSTEM
Filed Feb. 17, 1936  5 Sheets-Sheet 1
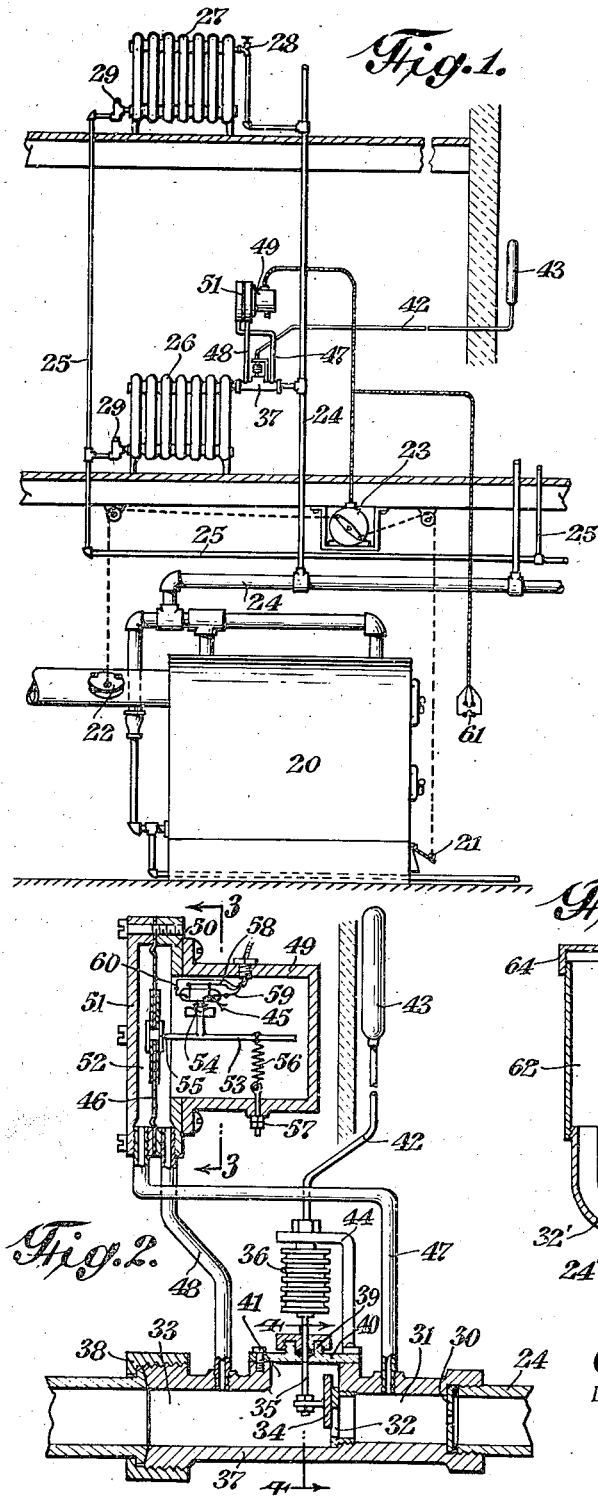
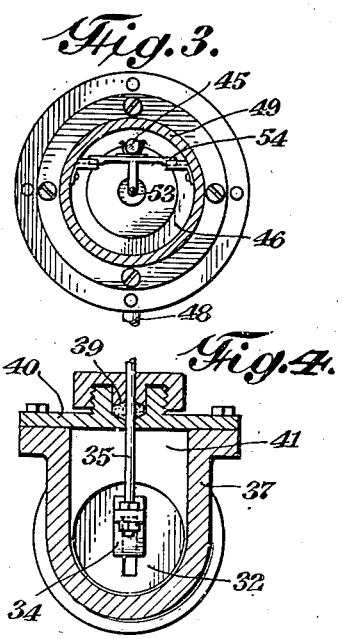
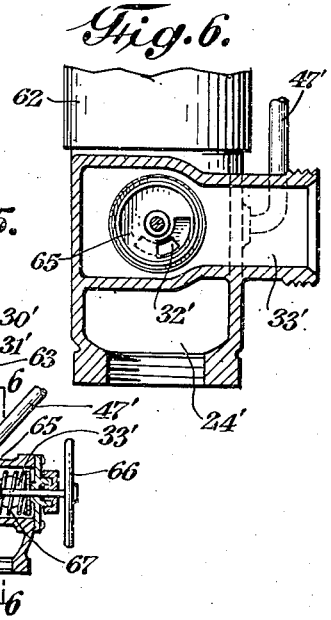
INVENTOR.
Gudmund Kamsvaag,
BY
ward Crosby + neal
ATTORNEYS Jan. 18, 1938.    G. KAMSVAAG    2,105,536
HEATING SYSTEM
Filed Feb. 17, 1936    5 Sheets-Sheet 2

INVENTOR
Gudmund Kamsvaag
BY
Ward Crosby & Neal
ATTORNEYS

Jan. 18, 1938. G. KAMSVAAG 2,105,536
HEATING SYSTEM
Filed Feb. 17, 1936  5 Sheets-Sheet 5

INVENTOR
Gudmund Kamsvaag
BY
Ward Crosby & Neal
ATTORNEYS

Patented Jan. 18, 1938

2,105,536

UNITED STATES PATENT OFFICE 2,105,536

HEATING SYSTEM

Gudmund Kamsvaag, Merchantville, N. J., assignor to Warren Webster & Company, Camden, N. J., a corporation of New Jersey Application February 17, 1936, Serial No. 64,220

17 Claims. (Cl. 236—91)

This invention relates to apparatus and methods for controlling the flow and distribution of a heat exchanging fluid medium, such for example as steam supplied to a heating system.

The purposes of this invention include the provision of economical and dependable apparatus for accurately controlling the production or flow of a heat exchanging fluid to a radiating system, the preferred embodiment of the apparatus being such that a standardized form of the equipment may be used in connection with a wide variety of heating systems of different sizes. Other purposes of the invention include the provision of simple and accurate methods of controlling the heat exchanging fluid in a manner whereby its flow to the system may be accurately varied substantially in direct proportion to changes in the prevailing temperature.

Various further and more specific objects, features and advantages will clearly appear from the detailed description given below taken in connection with the accompanying drawings forming a part of this specification and illustrating by way of example various preferred embodiments of the invention. The invention consists in such novel features, arrangements, combinations of parts and methods as are described in connection with the apparatus herein disclosed, by way of example only.

In the drawings, Fig. 1 comprises a schematic diagram of a steam heating system embodying certain features of my invention;

Fig. 2 is a vertical sectional view of certain control equipment which may be embodied in the system of Fig. 1;

Figs. 3 and 4 are sectional views taken respectively substantially along the lines 3—3 and 4—4 of Fig. 2;

Fig. 5 is a vertical sectional view of an alternative form of control valve which may be used in the system of Fig. 1;

Fig. 6 is a sectional view taken substantially along the line 6—6 of Fig. 5;

Figure 7:
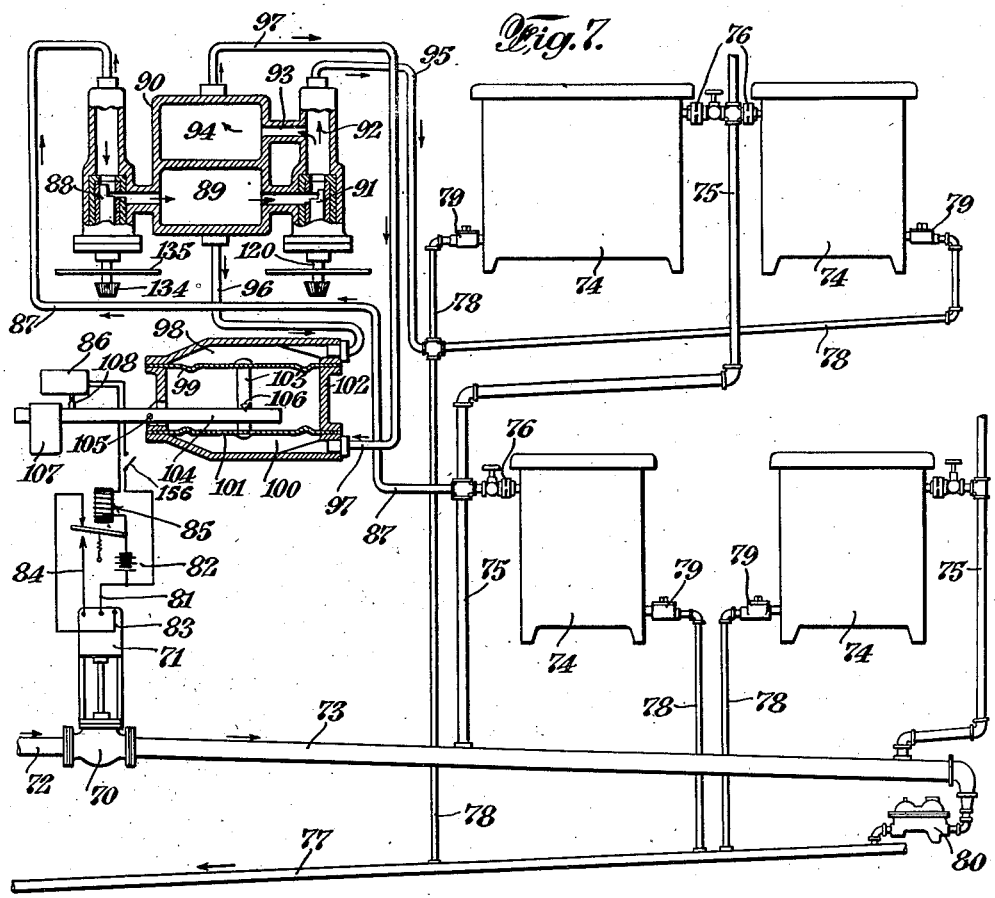
Fig. 7 is a schematic diagram of an alternative embodiment of apparatus including certain features of my invention.

In Fig. 1 a source of heat exchanging fluid, for example a boiler of conventional form for supplying steam, is indicated at 20, having fire box and flue dampers as at 21 and 22 operatively connected as shown to a motor as at 23 for opening or closing the dampers, and thereby increasing or decreasing the supply of steam from the boiler. The motor 23 may be of a reversible type, provided in a unitary assembly with stop switches and suitable gearing so that when current in one direction is applied thereto, it will relatively slowly open the dampers and then stop, and when current is applied in the opposite direction, it will slowly close the dampers and again stop. As here shown, the system may include steam supply conduits as at 24 and condensate return conduits as at 25, for serving a plurality of radiators as at 26 and 27. The intake openings of the radiators are preferably provided with valves as at 28, and also restricting orifices of a size calculated according to well-known methods for admitting to each radiator respectively a predetermined quantity of steam for a given pressure in the supply pipe leading to each radiator. Steam traps of well-known construction may be provided at the outlets of each of the radiators as indicated at 29.

One of the radiators as at 26 of convenient location has an inlet connection provided with the control equipment shown in Fig. 2 and which will now be described. Here one of the restricting orifices above mentioned is indicated at 30 for discharging steam from the supply connection 24 into an enclosed space 31. Another restricting orifice of variable area is indicated at 32 and through which steam from said space may be discharged to a conduit 33 leading to the radiator 26 or to the condensate return line of the system in case it is not desired to use any radiator at this point. The size of the variable orifice at 32 may be adjusted by a slidable valve piece 34, the position of which may be controlled by valve rod 35 mounted on an expansible fluid-filled bellows member 36.

The walls of the enclosed space 31 may comprise a unitary casting 37, with the intake conduit 24 sealed through one end thereof, and with an outlet coupling as at 38 at the other end thereof. As shown, the variable orifice member may be supported within the interior of the middle portion of this casting. The rod 35 may extend through a suitable stuffing box 39 mounted on a cover plate 40, this cover plate serving to seal an opening 41 at the mid portion of the casting 37. The opening 41 provides a ready means for access to the variable orifice member 32 and for cleaning, repair or replacement of the same.

The interior of the expansible bellows member 36 may communicate through a tube 42 with the interior of a bulb or the like 43, located preferably outdoors, or at a point where it will be subject to the temperature variations according to which the flow of the heat exchanging fluid is to be varied. The bellows 36, tube 42 and bulb 43 may be filled with a suitable fluid such as turpentine, having suitable properties of expansion upon variations of the temperature at the bulb 43, whereby the bellows 36 will be expanded substantially directly in proportion to changes in said temperature, with the result that the valve rod 35 will also be correspondingly moved and the area of the orifice 32 will also be varied substantially directly according to variations in said temperature. As shown in Fig. 4, the aperture at orifice 32 may comprise a vertically extending slot with parallel sides, so that upon variations in the elevation of the valve piece 34, the area of the slot will be correspondingly varied substantially in direct proportion to the movements of the valve piece. The upper end of the bellows member 36 may if desired be fixed to a bracket as at 44 mounted on cover plate 40.

In the upper part of Fig. 2 there is shown a tiltable glass-enclosed mercury switch as at 45, arranged to be controlled by a diaphragm 46, the position of this diaphragm in turn being controlled by the difference in pressure at opposite sides of the variable orifice 32. For this purpose a pressure connection as at 47 extends from the enclosed space 31 to one side of the diaphragm 46, and another pressure connection 48 extends from the discharge side of variable orifice 32 to the opposite side of diaphragm 46. The mercury switch and operating connections therefor, may be mounted within an enclosure 49 secured and sealed to a flange 50, against which the diaphragm 46 is sealed. The outside face of the diaphragm may be covered by a flanged cover plate 51 sealed at its periphery to the periphery of the diaphragm. Thus, a cavity 52 is provided at the outside face of the diaphragm and in communication through pipe 47 with the space 31. The inside face of the diaphragm on the other hand, is exposed to the pressure within the sealed enclosure 49 which is in communication through pipe 48 with the pressure at the discharge side of variable orifice 32.

Mercury switch 45 may be mounted upon a pivoted lever 53 having a knife-edged bearing as at 54. The member 53 may have an extension 55 provided with a knife-edged bearing pressing against the center portion of the diaphragm 46. As shown, the mid portion of the diaphragm may be suitably reinforced and provided with a bearing surface for the knife edge at 55. Another arm of the member 53 may be connected to a tension spring 56 provided with suitable means as at 57 for adjusting the spring from a point outside the housing 49. The switch 45 as shown may have a pair of contacts at each end, whereby upon tilting the switch, current from a common connection 58 may be applied either to a connection 59 or to a connection 60. The connections 58, 59, and 60 may comprise the control connections for the motor 23, which may be of a well-known reversible type, so that when the mercury switch is tilted in one direction, the motor will operate to close the dampers 21 and 22, and when the switch is tilted in the other direction, the motor will operate to open said dampers. If desired, a manually controlled reversing switch as at 61 located in the boiler room or any other convenient point, may be interposed in the motor circuits for manually controlling the motor independently of the condition of the pressure controlled mercury switch.

The outdoor thermostat, capillary tube and bellows member are preferably assembled with the proper amount of temperature responsive fluid, and tested and shipped, ready for installation, as a unit. In installing the expansible bellows, the same is preferably mounted in a separate compartment or is otherwise insulated in respect to the parts and spaces heated by the heating system, at least sufficient insulation being afforded around the bellows so that the effect of heat from the heating system on the action of the bellows, will be negligible.

The operating principles of the above described apparatus are based upon the fact that the amount of steam delivered through a restricting orifice under a constant pressure drop, varies directly with the size of the orifice, and the amount of steam delivered through a fixed orifice varies as the square root of the pressure drop. It will be observed that in the above described apparatus, I have provided an orifice 32, the area of which varies substantially in direct proportion to outdoor temperature changes, or in proportion to any temperature changes which may be desired to be used to control the system. And since as hereinafter explained, the equipment is designed to maintain a substantially constant pressure drop across the orifice 32, the amount of steam delivered therethrough will be in direct proportion to such temperature. And since the orifices 30 and 32 are in series, the same quantity of steam will flow through each except for the short intervals when orifice 32 is being adjusted. Consequently the amount of steam flowing through orifice 30, as well as the restricting orifices at the other radiators of the system, will be varied substantially directly in proportion to the temperature changes so long as the predetermined constant pressure drop is maintained across orifice 32. Accordingly the orifice 32 in effect acts as a small pilot valve which may be either manually or thermostatically controlled directly in accordance with varying temperatures, thereby controlling the steam flow to the whole system in the same direct relationship without the necessity of calibrating such pilot valve according to the square root law of steam flow. A more detailed example of the operation of the above described apparatus will now be given.

Assuming that the furnace dampers are open and a sufficient supply of steam is being provided through the steam supply conduits, steam will flow through the normally fixed orifice 30 into the enclosed space 31 and thence through the variable orifice 32. Since the orifices 30 and 32 are in series, the same quantity of steam will normally flow through each. However, there will be a substantial difference in pressure at opposite sides of the orifice 32 and this pressure difference will be communicated through connections 47 and 48 to the opposite sides of the diaphragm 46. The motor and damper control equipment is made and adjusted so as to regulate the production of steam in the boiler or otherwise provide a source of heat exchanging fluid sufficient to maintain a substantially constant pressure drop across the variable orifice 32. So long as this condition is maintained and the orifice 32 remains unchanged, a substantially constant flow of steam will be provided through the orifice 30, as well as through the restricting orifices at the inlets of the various radiators of the system. However, when the area of the variable orifice 32 is changed as a result of temperature changes, through the action of the temperature responsive fluid in bulb 43 and bellows 36, then there will be an alteration in the pressure difference across the variable orifice 32 and at opposite sides of the diaphragm 46. Thus, if a substantial increase in the prevailing temperature occurs, the alteration of this pressure difference will be in a direction such as to actuate the diaphragm and mercury switch so as to result in the closing of the dampers. The dampers will remain closed (or in partially closed condition, depending upon the mechanical adjustment thereof), until the steam flow supplied to the system drops to a point where the difference in pressure at opposite sides of the variable orifice 32 is somewhat less than a predetermined desired constant value necessary for proper heating, with the result that the diaphragm 46 and the mercury switch will act to reverse the motor 23, open the dampers and increase the supply of steam. This will tend to restore the pressure difference across variable orifice 32 to the desired constant value for proper heating, but eventually this desired constant value will be somewhat exceeded, with the result that the motor 23 will be again reversed. Thus, the supply of steam will be regulated so as to maintain substantially a constant pressure difference at opposite sides of the variable orifice 32, although during such regulation this pressure difference will fluctuate slightly above and below the desired normal value. But for practical purposes the desired normal pressure difference will be maintained across this variable orifice, notwithstanding variations of the orifice due to changes in temperature. Hence, this pressure difference being maintained at substantially a constant value, the amount of fluid flowing through the variable orifice and also through the normally fixed orifice 30 as well as the normally fixed orifices at the various radiators of the system, will vary substantially directly in proportion to the variations in the temperature which is used to control the system.

It is generally recognized that a controlled supply of steam in proportion to the prevailing outside temperature, will produce the highest degree of comfort and economy in the heating of living quarters. In order to produce the desired results and insure proper distribution of the steam to the various radiators of the system, it has been found advisable to install metering orifices at each of the heating units or radiators. Thus, radiators located at remote points from the source of supply or connected to the source through somewhat obstructed conduits, may be provided with orifices so calculated that each radiator will receive a predetermined proportion of the steam, depending upon the intended capacity of the radiator. However, since the amount of steam delivered through an orifice varies as the square root of the pressure drop across the orifice, the problem of designing a control means for the steam source, involves controlling the pressure of steam from the source in a way such that the pressure changes are not in direct proportion to the outdoor temperature changes. In view of this fact, with most pressure control systems heretofore devised for steam heating systems, where accuracy of control is desired, it has generally been considered necessary to provide different complicated designs of equipment or differently calibrated equipment, depending upon the size or type of the system and the desired temperature in the spaces heated. On the other hand, the above described apparatus is applicable to a wide variety of types of heating systems of various sizes and merely by adjusting the spring 56 or making any equivalent adjustments of the operating mechanism for the switch 45, the control equipment may be readily adapted for providing the spaces heated with a temperature substantially above or below 70° as desired, without any change in design. Also the above described equipment is not only adaptable for the control of a boiler, but the motor 23 or its equivalent may be applied for the direct or indirect control of the heat exchanging fluid in various other ways, as for example by throttling the main supply valve connected to a public service steam main, or a valve or other means for controlling the flow of or feeding the fuel supply or air, for a heating or cooling system. For example, in the various embodiments of the invention illustrated in Figs. 7–13 inclusive, the features of this invention are shown as applied to the control of a main steam valve.

In Figs. 5 and 6 I have illustrated a modification of the orifice structure arranged in a manner whereby the control of the variable orifice may be effected manually to provide for changes in prevailing temperature, instead of using the thermostatic control means shown in Fig. 2. In Figs. 5 and 6 a steam inlet is indicated at 24' adapted for connection to one of the steam supply conduits 24. From the inlet 24' steam may flow up into a cylinder 62, thence through a normally fixed restricting orifice 30' down through an enclosed space 31' within a cylinder 63, thence through a manually variable orifice 32', through a discharge opening 33', either to a radiator or to a return line of the heating system. A connection 47' may be provided in communication with the space 31' corresponding in function and operation with the connection 47 shown in Fig. 2. The discharge opening 33' may be brought into communication with a control diaphragm in the same way as the discharge opening 33 of Fig. 2. The cylinder 64 may be provided with a threaded removable cap 64 permitting of inspection, cleaning or replacement of the orifice 30'. The cylinders 62 and 63 may be removably mounted in threaded engagement with the main casting of the device for convenience in assembly, inspection or replacement of the parts. The orifice 32' may be formed in a removable member having an arcuate aperture as shown, this aperture being adapted to be closed to a variable extent depending upon the position of a rotatable valve piece 65, controlled by hand wheel 66, the valve piece being normally pressed in firm engagement with the orifice member by a spring 67.

Referring now to the modified form of equipment shown in Fig. 7, a main steam control valve is indicated at 70 and arranged to be operated by a reversible motor 71, of a suitable well-known type, for variably controlling the flow of steam from a source of supply 72 to a main steam line 73. A radiating system is provided including radiators as at 74 of various sizes and located at different distances from the source of supply and connected to the main steam line by risers 75. The inlets to each of the radiators as at 76 may be provided with normally fixed orifices, the aperture areas of which are so calculated as to provide a predetermined supply of steam to each radiator for a given pressure at the inlet so that the radiators more remote from the source of supply may still receive a quantity of steam depending upon their intended capacity. The system may be provided with a return line as at 77 provided with connections as at 78 to the outlets of each of the radiators, such outlets being preferably provided with steam traps as at 79 of well-known form. Condensate from the main steam line may be passed through a steam trap as at 80 and thence to the return line 77.

The reversible motor 71 may be provided with three terminals, terminal 81 being connected to a source of power as at 82, while terminal 83 is provided for a circuit to operate the motor in one direction and terminal 84 for a circuit to operate the motor in the other direction. The source of power may be alternately applied to the terminals 83 and 84 by a relay as at 85, which in turn may be controlled by a switch 86 of any well-known type, suitable to open or close a circuit upon application of a small mechanical force. That is, when the switch 86 is closed, the relay 85 will be energized for applying current to the motor terminal 83 to operate the motor in one direction, whereas when the switch 86 is open, the relay 85 will be released and current will be applied to the motor terminal 84 for causing the motor to operate in the other direction, as will readily be understood from inspection of the circuit schematically shown in Fig. 7.

The switch 86 is controlled in a manner similar to the control of the mercury switch 45 above referred to in connection with Fig. 2, although a modified embodiment of the apparatus is shown for this purpose in Fig. 7 and will now be described. Steam from the main 73 may be conducted by conduit 87 to an orifice member 88, which corresponds in function to the normally fixed orifice 30 above described. The particular orifice arrangement shown at 88 is designed to be adjustable in order to give the equipment a wider adaptability for various conditions of use and also to permit the control apparatus to be adjusted to give different predetermined supplies of heat to the system at different times of day according to a predetermined schedule. But for a given outdoor temperature and for a desired predetermined indoor temperature, the restricting aperture at the orifice arrangement 88 may be of fixed area. The details of construction of the orifice parts at 88 will be hereinafter described in connection with Fig. 10. From the orifice 88 the steam flows into an accumulator space 89 formed within a casting 90. From the space 89 steam is discharged through an orifice arrangement at 91 to a discharge cavity 92, which also communicates through passage 93 with another accumulator space 94. The orifice arrangement at 91 may be of a construction similar to that at 88, but the area of the restricting aperture is larger and intended to be varied to provide for outdoor temperature changes. For this purpose the orifice at 91 may be varied manually, or automatically by thermostatic means such as hereinafter described in connection with Figs. 8 and 13. Steam from the space 92 may be discharged through pipe 95 to the return line 77 or if desired, through a radiator. The spaces 89 and 94 respectively are provided with conduits 96 and 97 for the same purpose as the pipes 47 and 48 above referred to in connection with Fig. 2. That is, the conduit 96 runs to a chamber 98 for conveying pressure variations in the space 89 to a diaphragm 99, and conduit 97 runs to a chamber 100 for conveying pressure variations in the space 94 to a diaphragm 101. The peripheries of these two diaphragms are sealed in respect to the chambers 98 and 100 respectively and the diaphragms may be suitably mounted on a casting 102. The diaphragms may be interconnected at their central portions by a member 103 extending between two arms of a forked member 104, which member is pivoted as at 105 to the supporting casting 102. The arms of the member 104 may engage a knife-edged cross piece as at 106 carried by the diaphragm connecting member 103. Thus the difference in pressure between the spaces 89 and 94 (i. e. the difference in pressure at opposite sides of the adjustable orifice 91) is here applied to opposite sides of the structure comprising the two diaphragms 99 and 101, whereby variations in such difference in pressure, apply corresponding variations in force to the member 104, which member may be supplied with an adjustable counter weight 107. The member 104 is also provided with a suitable extension 108 for operating switch 86.

Figures 8, 9:
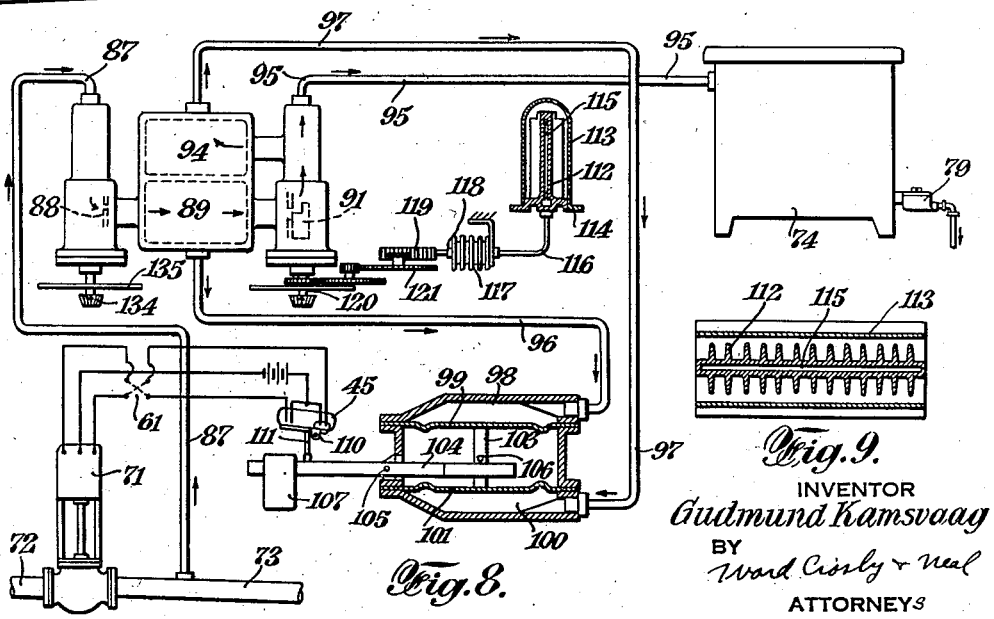
Fig. 8 is still another embodiment of the apparatus.
Fig. 9 is a horizontal sectional view of an outdoor thermostat which may be used in connection with the system of Fig. 8.

In the arrangement shown in Fig. 8, control of the motor 71 is effected directly from a mercury switch 45, without necessarily using an intervening relay. This mercury switch may be pivotally mounted as at 110, and is tilted by a member 111 operatively connected to the lever member 104. A manually operable reversing switch is indicated at 61 to permit an attendant to reverse the operation of the valve motor 71 if necessary or desired for any special purpose, regardless of the pressure conditions in the system. As shown in Fig. 8, the orifice 91 is also made adaptable for control by an outdoor thermostat. This thermostat may comprise an aluminum casting 112 formed with an extended surface for obtaining a quick response to changes in the temperature of the surrounding air. A sun shield 113 may be mounted directly on the base 114 of this casting. This casting may be formed with an internal cavity as at 115 for receiving a suitable quantity of fluid which will expand or contract to the desired extent in accordance with changes in temperature. For example, the cavity may be designed to contain from four to five cubic inches of turpentine. An adjustment screw extending through the wall of this casting may be provided at any desired point whereby the screw may be adjusted and sealed in a position to provide an internal cavity of a predetermined volume despite slight variations in the manufacture of the castings. A capillary tube 116 extends from the cavity 115 to the interior of an expansible bellows 117, whereby upon changes in the prevailing temperature the movable end 118 of the bellows will be moved to an extent substantially in direct proportion to the temperature changes. A rack member 119 may be connected to and operated by this movable end of the bellows and a rotatable shaft 120 for controlling the orifice 91 may be operatively connected to the rack 119 through a suitable train of gears 121.

In other respects the arrangement of Fig. 8 may be similar to that above described in connection with the preceding figures.

Figure 10:
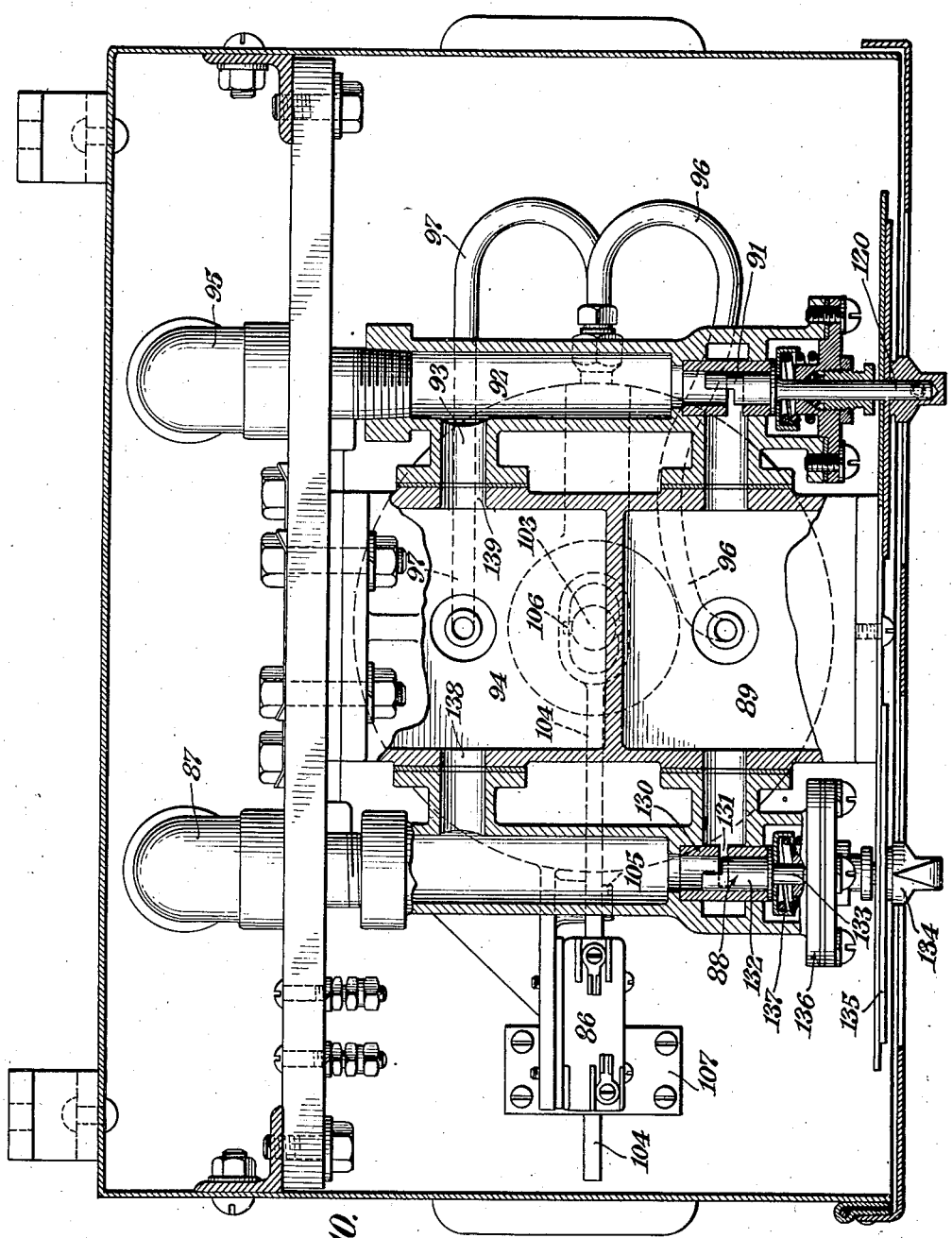
Figs. 10 and 11 are horizontal and vertical sectional views respectively of certain control equipment which may be used in the systems of Figs. 7 and 8.

In Fig. 10 the orifice arrangements 88 and 91 are shown in further detail in connection with the associated conduits, the accumulator spaces and other parts and supporting structure. Parts corresponding to those of Figs. 7 and 8 are identified by the same reference characters. The orifice arrangement at 88 may comprise a removable sleeve 130 having a circumferentially extending slot 131 which comprises the aperture of the orifice. The extent of the opening of this aperture may be varied by a rotatable valve piece 132 closely fitting within the member 130 and designed to be rotated by a shaft 133 and handle 134. A dial 135 may be provided for cooperation with a pointer mounted on the handle 134. The shaft 133 may be sealed through a suitable stuffing box construction 136 beneath which a spring 137 may be located for urging the valve piece 132 into proper position within the member 130. The construction of the orifice arrangement at 91 is similar to that at 88 and further details thereof are shown in section in Fig. 10. However, the shaft 120 for controlling the orifice at 91 may be provided either with a handle for manual adjustment or with a train of gears controlled by a thermostat as shown in Fig. 8. In fact, the operating parts at the lefthand and righthand sides of the assembly, Fig. 10, may be of like construction so that they may be used substantially interchangeably, depending upon the convenience of location of the connecting conduits. However, if the orifice arrangement at 88 is used as a normally fixed orifice, the passage at 138 will be closed off, whereas the opposite passage at 139 will remain open for bringing cavities 92 and 94 into communication.

In order to shut off the steam from the system when the outside temperature rises, say to 65 or 70°, or other predetermined point, a switch operating arm 155 (Fig. 11) may be secured to the shaft 120 in a predetermined position for tilting a mercury contact switch 156 whenever the shaft 120 is turned to a position corresponding to the temperature at which the steam is to be shut off. The switch 156 may be mounted upon a tiltable support 157 pivoted as at 158 to a supporting bracket 159. Switch 156 is here shown mounted on a housing for the apparatus, although of course it may be mounted if desired, directly upon the assembly which includes the orifice equipment. The switch may be connected as indicated at 156 in Fig. 7 for example, so as to open the control circuit and cause the main steam valve to be shut when the prevailing temperature reaches the predetermined value. Similar shut-off control switches may be provided with the other embodiments of the invention herein disclosed, but for simplicity the same have been omitted.

Figure 11:
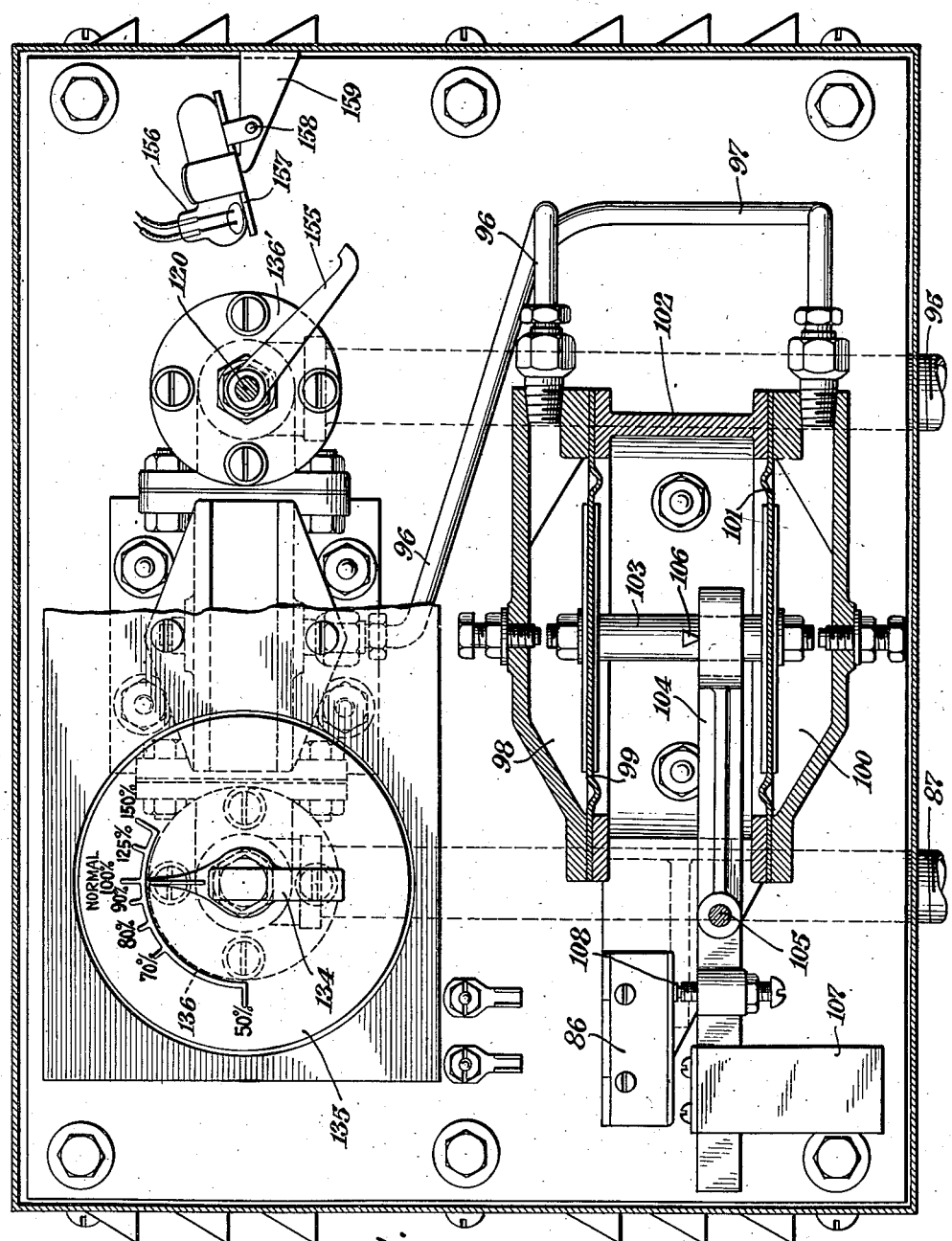

The construction and operation of other parts of Figs. 10 and 11 will be obvious from the above description of Fig. 7, in which corresponding parts are identified by the same reference characters.

Figure 12:
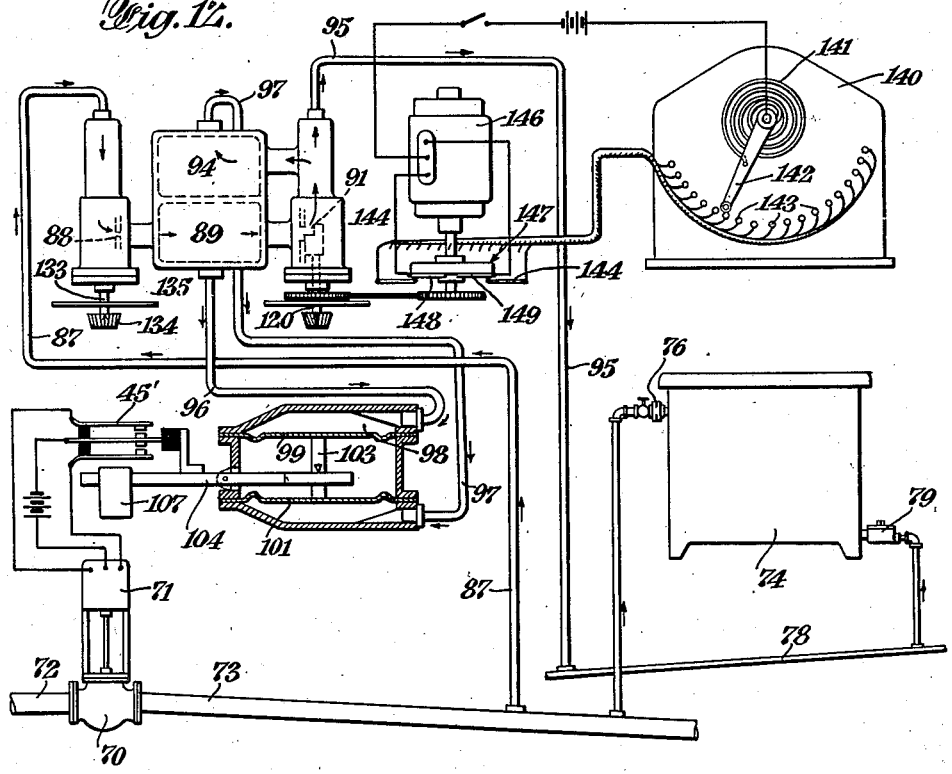
Fig. 12 is a schematic diagram of an alternative embodiment of the apparatus.
Figure 13:
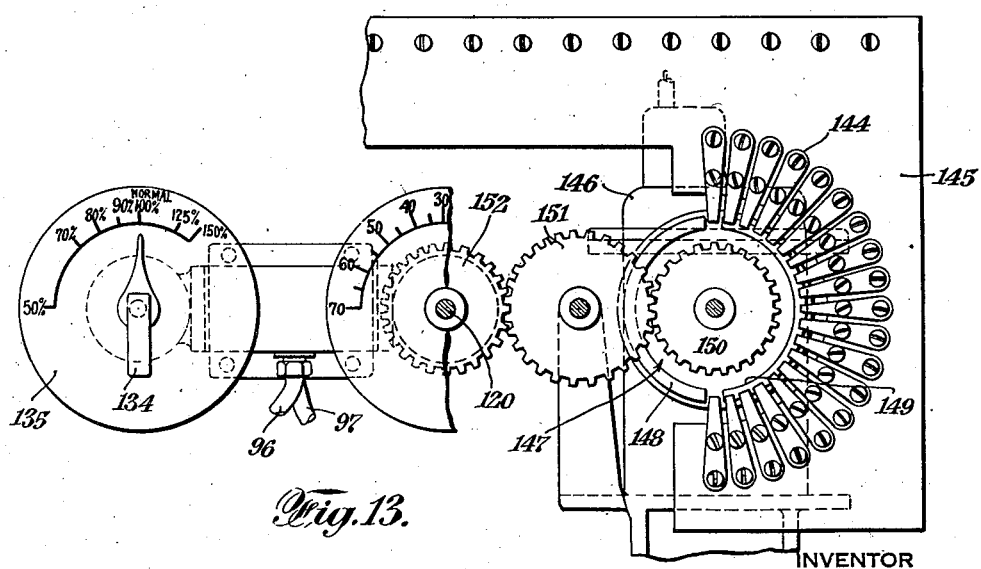
Fig. 13 is an enlarged elevational view partly broken away showing parts of the systems of Fig. 12 in further detail.

Figs. 12 and 13 illustrate a thermostatically controlled arrangement generally similar to that of Fig. 8 except that an electrical thermostat and connections are provided in lieu of a thermostat using a capillary tube. In this embodiment a thermostat 140 is located preferably out of doors, although under some circumstances it may be found possible or desirable to locate the same indoors within one of the rooms heated by the heating system. This thermostat may comprise a spiral bi-metallic thermostat element 141 arranged to move a contact arm 142 over a series of spaced contacts as at 143. The details of construction of a preferred form of such a thermostat are disclosed in the copending application of Karl W. Rohlin, Ser. No. 19,397, filed May 2, 1935. Each of the contacts 143 respectively is connected to one of a series of contacts 144 mounted on an insulating member 145 in arcuate relationship adjacent a control motor 146. A rotatable switch member 147 may be mounted on the shaft of this motor and may be provided with a pair of spaced arcuate contacts 148 and 149 cooperating with the contacts 144. A gear 150 may also be mounted on the motor shaft, this gear acting through other gears 151 and 152, or other equivalent connecting means, to adjust the angular position of the shaft 120 for controlling the adjustable orifice arrangement at 91.

The motor 146 may be of a reversible type of well-known construction, having one of its electrical terminals connected to the thermostatic strip 141 through a suitable source of power and having its other two electrical terminals respectively connected to the rotatable contacts 148 and 149. Upon each change in temperature at the thermostat 140, the contact arm 142 will serve to disconnect the source of power from one of the contacts 143 and at the same time connect the source of power to another of said contacts. Thus power will be applied to the corresponding newly selected contact 144, and thence to one or the other of the contacts 148 and 149. Then, depending upon which of the latter two contacts is energized, the motor will be operated in one direction or the other, until one of the insulation spaces between these contacts comes beneath the energized contact 144. Thereupon the motor will stop, but meanwhile the adjustable orifice arrangement 91 will be moved to a position of adjustment corresponding to the selected contact 143 at the thermostat. Similarly, upon each substantial movement of the thermostat contact arm 142 in either direction, the motor 146 will be operated in a corresponding direction until the newly selected contact 144 rests upon one of the insulating spaces between the contacts 148 and 149, whereupon the motor will stop and meanwhile the adjustable orifice will be readjusted to an extent substantially corresponding to the action of the thermostat. It will be apparent that this arrangement therefore provides a convenient and dependable means for adjusting the variable orifice at 91 by amounts substantially directly proportional to each substantial change in outdoor temperature, and through the use of the electrical connections, the thermostat may be readily located at a point remote from the other control equipment.

With heat controlling systems of this type, it is of great importance from the standpoint of economy of operation to insure against any possibility of breakdown of the apparatus and to be able to continue approximately the proper control of the steam even though the automatic thermostatic control equipment should fail to operate properly. This may be readily done with the equipment shown in Figs. 8, 12 and 13, since if the thermostat and the operating parts associated therewith should fail to function properly, an attendant may conveniently adjust the variable orifice arrangement 91, a handle having a pointer and an associated dial being provided at the shaft 120 for this purpose.

With some types of thermostatic control equipment operating step-by-step over a plurality of circuits, it has been the practice to insert in such circuits a multiple contact switch to permit in effect an arbitrary shifting of the relationship of the thermostat contacts with the contacts of the device controlled so as to permit controlled heating at various different temperature levels, according to a predetermined hourly or daily schedule. However, with the equipment shown in Figs. 12 and 13, the use of such a multi-contact switch which is sometimes difficult to maintain in proper working condition, is avoided and instead, the attendant may simply turn the handle 134, thereby altering the orifice arrangement 88 and thereafter the equipment will continue to control the heating at a higher or lower level as compared with the normal and to the extent indicated on the dial 135.

While the invention has been described with respect to certain particular preferred examples which give satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and desired to be secured by Letters Patent of the United States is:

1. In combination with a radiating system, apparatus for controlling the flow of a heat exchanging fluid medium to said system, comprising a fluid main, a motor operated valve in said main for variably controlling the flow of fluid therein, a restricting orifice through which a part of said fluid medium is discharged from said main, an enclosed space for receiving the fluid thus discharged, a variable restricting orifice for discharging fluid from said space, and a device controlled by the difference in pressure at opposite sides of said variable orifice, said device acting to regulate the operation of said valve and thereby the flow of fluid in said main at a rate to maintain said pressure difference at substantially a constant value, notwithstanding adjustments of said variable orifice.

2. In combination with a radiating system, apparatus for controlling the flow of a heat exchanging fluid medium to said system, comprising a fluid main, a motor operated valve in said main for variably controlling the flow of fluid therein, a restricting orifice through which a part of said fluid medium is discharged from said main, an enclosed space for receiving the fluid thus discharged, a variable restricting orifice for discharging fluid from said space, thermostatic means for adjusting said variable orifice substantially in accordance with temperature changes occurring at a point unaffected by said heat exchanging medium, and a device controlled by the difference in pressure at opposite sides of said variable orifice, said device acting to regulate the operation of said valve and thereby the flow of fluid in said main at a rate to maintain said pressure difference at substantially a constant value.

3. In a heating system, a steam main, a valve in said main for variably controlling the flow of steam therein, a restricting orifice through which a part of the steam is discharged from said main, an enclosed space for receiving the steam thus discharged, a variable restricting orifice for discharging steam from said space, and a device controlled by the difference in steam pressure at opposite sides of said variable orifice, said device acting to regulate said valve and thereby the flow of steam in said main at a rate to maintain said pressure difference at substantially a constant value.

4. In a heating system, a steam main, a valve in said main for variably controlling the flow of steam therein, a restricting orifice through which a part of the steam is discharged from said main, an enclosed space for receiving the steam thus discharged, a variable restricting orifice for discharging steam from said space, and a device controlled by the difference in pressure at opposite sides of said variable orifice, said device acting to regulate said valve and thereby the flow of fluid in said main.

5. In a heating system, a steam main, a valve in said main for variably controlling the flow of steam therein, a restricting orifice through which a part of the steam is discharged from said main, an enclosed space for receiving the steam thus discharged, a variable restricting orifice for discharging steam from said space, thermostatic means for adjusting said variable orifice, and a device controlled by the difference in pressure at opposite sides of said variable orifice, said device acting to regulate said valve and thereby the flow of fluid in said main.

6. Apparatus for controlling the flow of a heat exchanging fluid, including a source of supply of said fluid, means for conveying a part of said fluid from said source to an enclosed space at a rate which is normally fixed for a given pressure of the fluid from said source, a variable restricting orifice for discharging fluid from said space, a movable member and operative connections thereto for variably positioning said member in accordance with the difference in pressure at opposite sides of said variable orifice, and a plurality of electrical circuits selectively controlled according to the position of said movable member.

7. Apparatus for controlling the flow of a heat exchanging fluid, including a source of supply of said fluid, valve means controlling the supply of said fluid to a radiating system, means for conveying a part of the fluid thus supplied to an enclosed space at a rate which is normally fixed for a given pressure of the fluid within said conveying means, a variable restricting orifice for discharging fluid from said space, a movable member and operative connections thereto for variably positioning said member in accordance with the difference in pressure at opposite sides of said variable orifice, a plurality of electrical circuits selectively controlled according to the position of said movable member, and means controlled by said circuits for regulating said valve means.

8. The method of controlling the flow of steam to a steam heating system which comprises discharging a part of such steam into an enclosed space at a rate which is normally fixed for a given pressure of the steam flowing to the system, discharging the steam from said space through a variable restricting orifice, varying said orifice upon variations in prevailing outdoor temperatures, and utilizing the difference in pressure at opposite sides of said variable orifice for controlling a valve to regulate the flow of steam to the system at a rate such as to maintain said pressure difference at substantially a constant value.

9. The method of controlling the flow of steam to a steam heating system which comprises discharging a part of such steam into an enclosed space at a rate which is normally fixed for a given pressure of the steam flowing to the system, discharging the steam from said space through a variable restricting orifice, and utilizing the difference in pressure at opposite sides of said variable orifice for controlling a valve to regulate the flow of steam to the system at a rate such as to maintain said pressure difference at substantially a constant value.

10. In a steam heating system, means for variably supplying steam to the system, a restricting orifice through which at least a part of said steam is discharged, an enclosed space for receiving steam thus discharged, a variable restricting orifice for discharging steam from said space, and a device controlled by the pressure drop across said variable orifice, said device acting to regulate said means for supplying steam to the system whereby steam is supplied at a rate to maintain said pressure drop at substantially a constant value.

11. In a steam heating system, means for variably supplying steam to the system, a restricting orifice through which at least a part of said steam is discharged, an enclosed space for receiving steam thus discharged, a variable restricting orifice for discharging steam from said space, a device controlled by the pressure drop across said variable orifice, said device acting to regulate said means for supplying steam to the system whereby steam is supplied at a rate to maintain said pressure drop at substantially a constant value, said first mentioned restricting orifice being normally fixed when the steam supply is controlled for normal heating by the system, and means for adjusting said normally fixed orifice to provide for controlled heating at a temperature level different from such normal heating.

12. In a steam heating system, a boiler, means for variably heating said boiler for variably supplying steam to the system, a restricting orifice through which at least a part of said steam is discharged, an enclosed space for receiving steam thus discharged, a variable restricting orifice for discharging steam from said space, and a device controlled by the pressure drop across said variable orifice, said device acting to regulate said means for variably heating the boiler whereby steam is supplied from the boiler to the system at a rate to maintain said pressure drop at substantially a constant value.

13. In a steam heating system, a boiler, means for variably heating said boiler for variably supplying steam to the system, a restricting orifice through which at least a part of said steam is discharged, an enclosed space for receiving steam thus discharged, a variable restricting orifice for discharging steam from said space, a device controlled by the pressure drop across said variable orifice, said device acting to regulate said means for variably heating the boiler whereby steam is supplied from the boiler to the system at a rate to maintain said pressure drop at substantially a constant value, and thermostatic means for adjusting the size of said variable orifice substantially in direct proportion to variations in the heating requirements of the system as determined by temperature changes affecting the exterior of the spaces heated by the system.

14. In a heating system, a boiler, means for variably heating the boiler for variably supplying steam to the system, a restricting orifice through which a part of the steam thus supplied is discharged, an enclosed space for receiving the steam thus discharged, a variable restricting orifice for discharging steam from said space, a device controlled by the difference in pressure at opposite sides of said variable orifice, said device acting to regulate said means for supplying heat to the boiler and thereby regulating the supply of steam to the system, and thermostatic means for adjusting the size of said variable orifice.

15. The method of controlling the flow of steam to a steam heating system, which comprises discharging a part of such steam into an enclosed space at a rate which is normally fixed for a given pressure of the steam flowing to the system, discharging the steam from said space through a variable restricting orifice, and utilizing the difference in pressure at the opposite sides of said variable orifice for regulating the flow of steam to the system at a rate such as to maintain said pressure difference at a substantially constant value.

16. The method of controlling the flow of steam to a steam heating system, which comprises discharging a part of such steam into an enclosed space at a rate which is normally fixed for a given pressure of the steam flowing to the system, discharging the steam from said space through a variable restricting orifice, utilizing the difference in pressure at the opposite sides of said variable orifice for regulating the flow of steam to the system at a rate such as to maintain said pressure difference at a substantially constant value, and thermostatically controlling the size of the variable orifice whereby the rate of flow of the steam to the system is thermostatically regulated and varied substantially in direct proportion to the variations in the size of said variable orifice while said pressure difference still remains substantially constant.

17. A heating system comprising a steam main, a plurality of radiators connected to said steam main through restricting orifices of predetermined size, means for variably supplying steam to said steam main, a restricting orifice through which a part of the steam in said main is discharged therefrom, an enclosed space for receiving the steam thus discharged, a variable restricting orifice for discharging steam from said space, and a device controlled by the difference in pressure at opposite sides of said variable orifice, said device acting to regulate the operation of said steam supply means and thereby the flow of steam in said main at a rate to maintain said pressure difference at substantially a constant value.

GUDMUND KAMSVAAG.